Aug. 24, 1943.          B. H. CARROLL                2,327,764
                       ULTRAVIOLET FILTER
                       Filed May 9, 1941

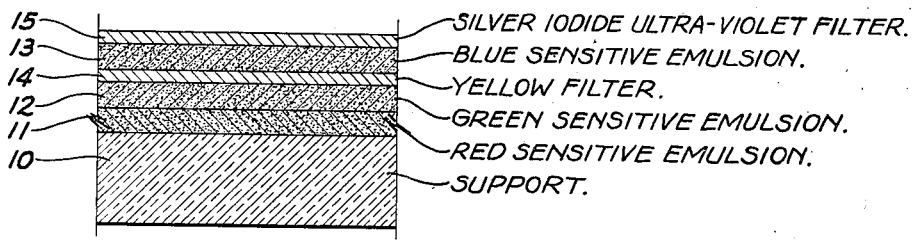

Fig. 1

- 15 — SILVER IODIDE ULTRA-VIOLET FILTER.
- 13 — BLUE SENSITIVE EMULSION.
- 14 — YELLOW FILTER.
- 12 — GREEN SENSITIVE EMULSION.
- 11 — RED SENSITIVE EMULSION.
- 10 — SUPPORT.

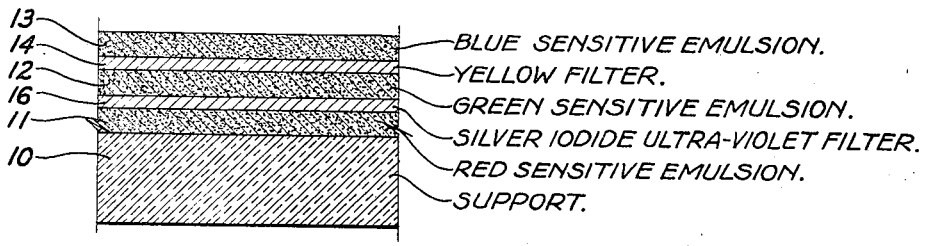

Fig. 2

- 13 — BLUE SENSITIVE EMULSION.
- 14 — YELLOW FILTER.
- 12 — GREEN SENSITIVE EMULSION.
- 16 — SILVER IODIDE ULTRA-VIOLET FILTER.
- 11 — RED SENSITIVE EMULSION.
- 10 — SUPPORT.

BURT H. CARROLL
INVENTOR

BY *Newton M. Perkins*
*R. Frank Smith*
ATTORNEYS

Patented Aug. 24, 1943

2,327,764

UNITED STATES PATENT OFFICE 2,327,764

ULTRAVIOLET FILTER

Burt H. Carroll, Rochester, N. Y., assignor to Eastman Kodak Company, Rochester, N. Y., a corporation of New Jersey Application May 9, 1941, Serial No. 392,725

4 Claims. (Cl. 95—2)

This invention relates to color photography and particularly to ultra-violet filter layers for photographic film.

In color photography, it is highly desirable to avoid the action of ultra-violet radiation on the emulsions which record the colored images. The theory of color photography depends upon the use of sensitive media which record the visible colors to which the eye is sensitive, and the color values are obviously falsified by recording invisible radiation. Photographic emulsions are highly sensitive to blue light and this sensitivity extends into the ultra-violet region of the spectrum. The eye has a high sensitivity to green light but its sensitivity decreases as the wave length of light decreases while that of the photographic emulsion increases as the wave length decreases toward the violet and ultra-violet spectral region. This difference between the sensitivity of the eye and the sensitivity of the photographic emulsion should, therefore, be compensated by decreasing the sensitivity of the photographic material if correct color reproduction is to be had.

This falsification of color reproduction is especially noticeable in multi-layer photographic material having a blue-sensitive top layer and a yellow filter layer between the top layer and the lower layers which record green and red light. The yellow filter layer absorbs the ultra-violet light which would act on the lower emulsion layers but does not prevent its action on the top emulsion layer. A second filter is, therefore, desirable: one which may be used over all emulsion layers and which will decrease the intensity of some of the violet radiation which is classified as visible, as well as the ultra-violet radiation, since the action of these rays on the emulsion is greater than its action on the eye.

We have found that a dispersion of silver iodide in a water-permeable colloid, such as gelatin, in which the greater part of the particles are below the limit of microscopic visibility by transmitted light has an absorption which makes it useful as an ultra-violet filter for color photography.

In the accompanying drawing, Fig. 1 is a sectional view of a multi-layer film according to my invention having an ultra-violet filter over the emulsion layers and Fig. 2 is a sectional view of a multi-layer film having an ultra-violet absorbing intermediate layer according to my invention.

Silver iodide dispersed in the proper manner in a water-permeable colloid, especially a protein such as gelatin, is very transparent to light of 430 to 440 millimicrons and longer wave lengths and absorbs strongly at 410 millimicrons and shorter wave length. The most satisfactory form of filter material is an emulsion in gelatin prepared so that the material is substantially grainless and transparent to visible light. It is much more simple to make grainless emulsions of pure silver iodide than of the other halides because its very low solubility reduces the tendency for growth of grains.

In addition to gelatin as a dispersing material for the silver iodide, I may use other proteins such as albumen or casein, or synthetic materials such as polyvinyl phthalate, coated from a mixture of methyl Cellosolve and methyl alcohol, the polyvinyl acetal resin prepared by reacting a polyvinyl compound with an alkylamino benzaldehyde as described in Swan U. S. Patent application Serial No. 349,229, filed August 1, 1940.

A silver iodide emulsion for use as a filter for ultra-violet light according to my invention may be prepared in the following manner:

An emulsion may be prepared by a simple formula such as the following:

A { 100 cc. 10% gelatin
    10 cc. 6.8% silver nitrate solution
B { 100 cc. 10% gelatin
    10 cc. 6.65% potassium iodide solution Pour B rapidly into A at about 40° C.

While the above formula may be given as an example, we have found a procedure which is much more satisfactory for preparation in large quantities and at higher concentrations. The essential feature is that an excess of silver over iodide should be maintained until close to the end of the reaction. It is possible to make an emulsion in which 98–99% of the silver is allowed to react with iodide as described, then finally a soluble bromide equivalent to 2–4% of the silver is added; in this way there is avoided any danger that the emulsion will contain excess soluble iodide, which is difficult to remove by washing and may desensitize underlying layers. An illustrative formula is as follows:

A. 500 cc. 10% gelatin solution
B. 250 cc. 2.50% silver nitrate solution
C. 250 cc. 2.50% potassium iodide solution 10 cc. of B is first added to A, then the remainder of B and C are simultaneously run into A at exactly the same rate, with good stirring. The temperature is held at about 40° C. After the reaction is complete a small amount of 10% potassium bromide solution is added, and the emulsion is set, shredded and washed. It is then ready for use.

My invention will now be described with reference to the accompanying drawing. As shown in Fig. 1, a support of any suitable material such as glass, cellulose esters, synthetic resins or paper is coated with emulsion layers 11, 12 and 13 sensitive respectively to the red, green and blue regions of the spectrum. The usual yellow filter layer 14 is coated between emulsion layers 12 and 13. Over emulsion layer 13 there is a layer 15 of gelatin containing silver iodide according to my invention. The layer 15 absorbs ultra-violet light and prevents its action on the blue-sensitive emulsion layer 13.

Fig. 2 is a sectional view of a multi-layer element in which support 10 is coated with emulsion layers 11, 12 and 13 sensitive respectively to the red, green and blue regions of the spectrum. The yellow filter layer 14 is coated between emulsion layers 12 and 13 and an ultra-violet absorbing layer 16 of gelatin containing silver iodide is coated between emulsion layers 11 and 12. In certain types of multi-color processing such as that described in Mannes, Godowsky and Wilder U. S. Patent 2,252,718, granted August 19, 1941, it is desirable to expose emulsion layer 11 through the support. If the layer 11 does not retain its color sensitivity it may be necessary to expose it by ultra-violet light and the ultra-violet absorbing layer 16 in that case prevents action of light on the layer 12.

In certain cases it may be desirable to coat the ultra-violet absorbing layer according to my invention in other positions in the film such as on the back of the support for the purpose of absorbing any ultra-violet light which may affect the film during exposure or processing. Ultra-violet filter layers according to my invention may also be used as separate filters over the camera lens during exposure, but their greatest value lies in the fact that they may be coated in contact with photographic emulsions without densitizing or fogging action. They are so completely transparent that the definition of the image is not adversely affected. They are insensitive to light and, therefore, are difficult to develop in the ordinary developing solutions used for silver bromide. For this reason no reduction of the silver iodide to silver occurs during processing of the exposed element of which they are a part. They are extremely fine grained and substantially transparent to visible light rays and they are readily removed in the fixing solutions used in processing the element.

Although my invention is limited to the use of silver iodide as a filtering material for ultra-violet light, the examples included herein with respect to dispersing materials and methods of preparing the dispersions are illustrative only and it is to be understood that my invention is to be taken as limited only by the scope of the appended claims.

I claim:

1. A multi-layer photographic element comprising a support having thereon a plurality of differently sensitive emulsion layers and an ultra-violet absorbing layer comprising a water-permeable colloidal material containing a light-insensitive, grainless silver iodide substantially transparent to all visible light.

2. A multi-layer photographic film comprising a transparent support having thereon a plurality of differently sensitive emulsion layers and over one of said emulsion layers a layer of a protein containing a light-insensitive, grainless silver iodide, said layer absorbing ultra-violet light but being substantially transparent to all visible light.

3. A multi-layer photographic film comprising a transparent support having thereon a plurality of differently sensitive emulsion layers and over said emulsion layers a layer of gelatin containing dispersed light-insensitive, grainless silver iodide, said layer being absorptive of ultra-violet light and transmissive of substantially all visible light.

4. A multi-layer photographic film comprising a transparent support having thereon gelatino silver halide emulsion layers sensitive, respectively, to the red, green and blue regions of the spectrum and over said emulsion layers an ultra-violet filter layer comprising gelatin containing dispersed light-insensitive, grainless silver iodide, said layer absorbing ultra-violet light but transmitting substantially all of the visible light rays.

BURT H. CARROLL.